Feb. 17, 1948.  H. CARTMILL  2,436,199
PEDAL SCOOTER
Filed Feb. 7, 1945  2 Sheets-Sheet 1
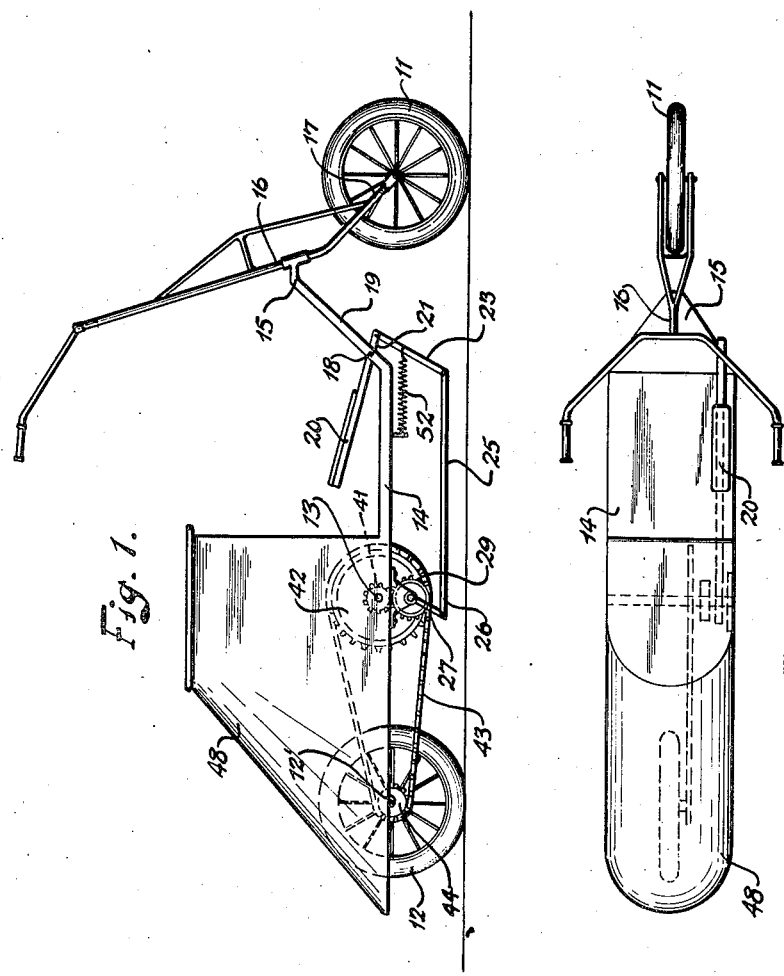
Inventor
Holley Cartmill.
By Clarence A. O'Brien
and Harvey B. Jacobson
Attorneys Feb. 17, 1948.   H. CARTMILL   2,436,199
PEDAL SCOOTER
Filed Feb. 7, 1945    2 Sheets-Sheet 2
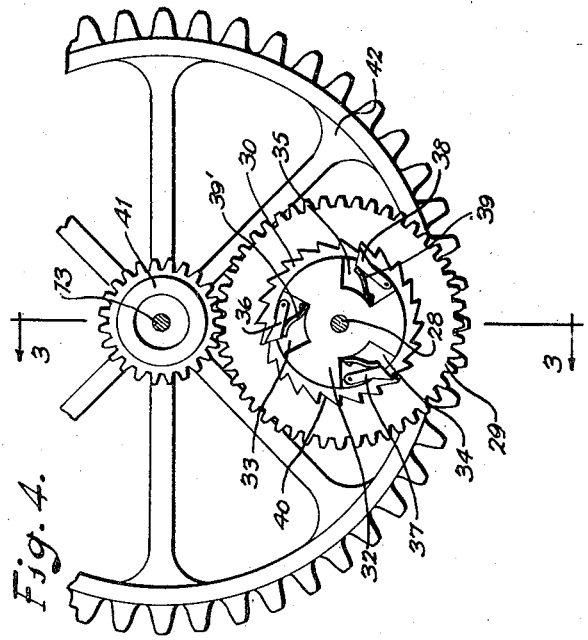
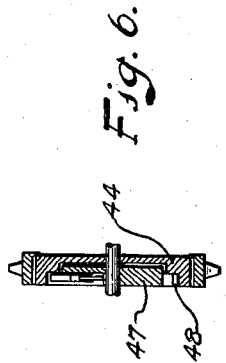
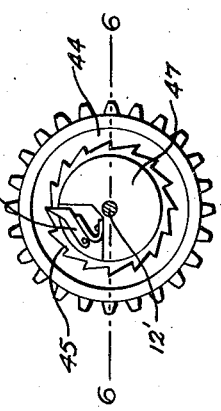
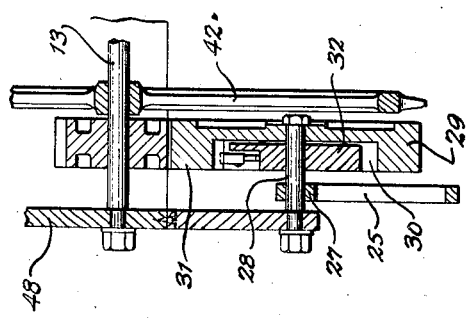
Inventor
Holley Cartmill.
By Clarence A. O'Brien
and Harvey B. Jacobson
Attorneys Patented Feb. 17, 1948

2,436,199

UNITED STATES PATENT OFFICE 2,436,199

PEDAL SCOOTER

Holley Cartmill, San Bernardino, Calif.

Application February 7, 1945, Serial No. 576,563

3 Claims. (Cl. 280—255)

This invention relates to velocipedes and has for its object to provide a pedal actuated propelling mechanism.

Another object of the invention is to provide a two-wheeled vehicle having a pedal operated propelling mechanism and spring means for actuating the pedal in one direction.

A further object of the invention is to provide a pedal operated propelling mechanism including gears and means embraced in the mechanism for releasing the gears upon reverse movement of the pedal.

Other features and advantages will become more readily apparent from the following description and the accompanying illustrative drawings in which:

Figure 1 is a side elevational view of my scooter,

Figure 2 is a top plan view thereof,

Figure 3 is a sectional view on line 3—3 of Figure 4,

Figure 4 is an enlarged elevational view of a sprocket wheel operating mechanism, Figure 5 is a view similar to Figure 4 of another sprocket operating means, and Figure 6 is a sectional view on line 6—6 thereof.

In the accompanying drawings as above enumerated and in the following specification, like characters of reference indicate like parts throughout and in which 10, is an illustration of my pedal driven scooter, which consists of front and rear wheels 11 and 12, an axle 12', on which is supported a platform 14, the forward inclined end 15, of which is secured to the frame 16. This frame is the steering frame on which the handle bars are mounted. Its lower portion comprises a fork 17, of which the front wheel 11, is mounted. Pivotally mounted at 18, on incline 19, is a treadle 20, the end 21, of which, projects through a slot, in the incline and carries a downwardly extending arm 23, the lower end of which is pivoted to the end of an elongated link rod 25. A spring 52 is attached to said arm and platform 14, to return it to its position of rest after release of the treadle. The rear end 26, of rod 25, is in turn pivotally connected to a lever 27, fixed to a stub shaft 28, which it rotates back and forth. Also rotatably mounted on the shaft 28, is a large gear 29, provided with an annular recess 30, in its outer surface 31, within which is seated and fixedly mounted on shaft 28, a disk 32. This disk is provided with a number of recesses 33, 34 and 35, in which pivotally mounted dogs 36, 37 and 38 are located which are normally pressed outwardly by springs 39, and which engage in one direction the internal ratchet teeth 40, formed in the inner peripheral edge surrounding the recess 30; the dogs slide over said teeth during a movement in the reverse direction, whereby, when the rod 25, and lever 27, are drawn forward by the downward movement of treadle 20, the said dogs will engage teeth 40, and rotate gear 29, which in turn rotates the small gear 41, fixed to a large sprocket wheel 42, mounted rotatably on axle 13 if said axle is fixed in the frame, or on the axle itself if the latter is mounted rotatably.

Trained over the sprocket wheel 42, is a sprocket chain 43, driving a small sprocket wheel 44, loose on axle 12' of wheel 12. The central portion of the wheel 44, is cut out and is provided with a set of internal ratchet teeth 45, adapted to engage the spring pressed pawl 46, pivoted on a disk 47, which disk is fixed on the axle 12', of wheel 12 within the cut portion of wheel 44, whereby the action of the chain operating in one direction drives wheel 12. However, when the chain 43, slacks because the wheel 12, is rotating at a greater speed than the sprocket wheel, the pawl 46, will slide over the ratchet teeth whereby the wheel 12, is released from the action of sprocket 44.

A body 48, is mounted on the platform 14, the top of which forms a seat for the user of the scooter.

The operation of the propelling mechanism of the scooter is as follows: When the treadle 20, is pressed down, its projection 21, draws up arm 23, which pulls rod 25, forward, which in turn rotates lever 27, and shaft 28, anti-clockwise. The rotational movement of shaft 28 turns member 32 and its dogs engaging the ratchet teeth 40, whereby gear 29, is rotated. Gear 41, which is engaged by gear 29 drives sprocket wheel 42, chain 43, and sprocket 44, on axle 12' of wheel 12. With this direction of movement the axle 12' and the wheel 12 will be driven by means of disk 47 and pawl 46. When the spring 52, draws arm 23, rearward and downward, the dogs 36, 37 and 38, release their respective ratchets. When coasting the movement of wheel 12 will not affect the sprocket wheel and chain, as the dog 46 glides over the internal ratchet teeth 45 without engaging them.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A pedal operated scooter with two wheels, a frame supported by said wheels, and a driving mechanism for the rear wheel, the latter comprising a unidirectionally operative mechanism on the rear wheel, intermediate shafts mounted on said frame, a unidirectionally operative mechanism on one of said intermediate shafts, driving wheels adapted to be coupled with said rear wheel and said intermediate shafts respectively by means of said unidirectionally operative mechanisms, means for positively connecting said driving wheels with each other for the transmission of movement, and means for operating the intermediate unidirectionally operative mechanism, said means including a treadle on the fore part of the frame.

2. A pedal operated scooter, with two wheels comprising a frame, a treadle pivoted near the front end of said frame, a driving rod operatively connected with said treadle and moved in a substantially longitudinal direction, a spring for returning the aforesaid parts to their original positions, a unidirectional drive mechanism mounted in an intermediate position between the scooter wheels on said frame, said mechanism including a driving sprocket wheel, gear wheels for driving the same, a rotatable shaft arranged centrally with one of said gear wheels, a pawl and ratchet mechanism, centrally arranged on said shaft for transmitting motion between the same and the gear wheel arranged centrally with respect to the same, means for connecting said shaft with said driving rod, and unidirectionally operative wheel drive mechanism on the rear wheel of the scooter, operatively connected with the intermediate drive mechanism and including a sprocket wheel, and a unidirectionally operative pawl and ratchet mechanism, arranged between said wheel and said sprocket wheel.

3. A pedal operated scooter with two wheels comprising a frame supported by the wheels, a treadle pivoted near the front end, two intermediate shafts mounted on said frame in an intermediate position between the wheels, one shaft being connected by a crank and lever mechanism with said treadle, a sprocket wheel on the second shaft, a larger and a smaller gear wheels meshing with each other on the two intermediate shafts for providing a transmission increasing the angular speed of rotation, the larger gear wheel being centered on the shaft driven by the crank and lever mechanism, said larger gear wheel being provided with a central recess, a unidirectional pawl and ratchet mechanism within said recess arranged between the aforesaid shaft and said gear wheel, a second sprocket wheel on the rear wheel, provided with a central recess, a unidirectional pawl and ratchet mechanism within said recess, arranged between said second sprocket wheel and said rear wheel, and means for transmitting motion between the sprocket wheels.

HOLLEY CARTMILL.

REFERENCES CITED

The following references are of record in the file of this patent:

UNITED STATES PATENTS

| Number | Name | Date |
| --- | --- | --- |
| 366,288 | Vost et al. | July 12, 1887 |
| 390,174 | Lambert | Sept. 25, 1888 |
| 446,670 | Elliott | Feb. 17, 1891 |
| 634,192 | Vaughn | Oct. 3, 1899 |
| 1,581,168 | Bullermann | Apr. 20, 1926 |
| 1,688,024 | Scholer | Oct. 16, 1928 |